United States Patent [19]
Maeda

[11] Patent Number: 5,740,543
[45] Date of Patent: Apr. 14, 1998

[54] PORTABLE TELEPHONE SET INCORPORATING A MESSAGE RECORDING FEATURE

[75] Inventor: Koji Maeda, Tokyo, Japan

[73] Assignee: NEC Corporation, Tokyo, Japan

[21] Appl. No.: 911,172

[22] Filed: Aug. 14, 1997

Related U.S. Application Data

[63] Continuation of Ser. No. 436,493, May 8, 1995, abandoned.

[30] Foreign Application Priority Data

May 6, 1994 [JP] Japan .................................. 6-094465

[51] Int. Cl.$^6$ .................... H04Q 7/20; H04Q 7/32
[52] U.S. Cl. .................... 455/550; 455/412; 455/575; 379/75; 379/85
[58] Field of Search ............... 455/412, 414, 455/425, 550, 556, 575, 90; 379/67, 68, 75, 85, 88, 202

[56] References Cited

U.S. PATENT DOCUMENTS

| | | | |
|---|---|---|---|
| 4,860,339 | 8/1989 | D'Agosto, III et al. | 379/67 |
| 4,875,229 | 10/1989 | Palett et al. | 379/58 |
| 5,335,261 | 8/1994 | Fujinaka | 379/58 |
| 5,568,538 | 10/1996 | Tamir et al. | 455/412 |

FOREIGN PATENT DOCUMENTS

| | | | |
|---|---|---|---|
| 0584666A1 | 3/1994 | European Pat. Off. | |
| 2181624 | 4/1987 | United Kingdom | 379/58 |
| 2227394 | 7/1990 | United Kingdom | 379/61 |
| WO92/09166 | 5/1992 | WIPO | |

*Primary Examiner*—Dwayne Bost
*Assistant Examiner*—Nay Maung
*Attorney, Agent, or Firm*—Sughrue, Mion, Zinn, Macpeak & Seas, PLLC

[57] ABSTRACT

A receiving section receives a radio signal and sends out a demodulation output thereof to a receiver. A transmitting unit modulates a voice signal input from a transmitter and transmits the voice signal as a radio signal. A voice memory unit stores the voice signal. A switch temporarily inhibits a coupling of the output voice signal of the transmitter to the transmitting section while allowing a coupling of the output voice signal to the voice memory unit for storing thereof.

4 Claims, 4 Drawing Sheets

FIG. 2

| | | | |
|---|---|---|---|
| 1 | 2 | 3 | MEMO REGISTER |
| 4 | 5 | 6 | MEMO PLAY |
| 7 | 8 | 9 | SEND |
| * | 0 | # | END |

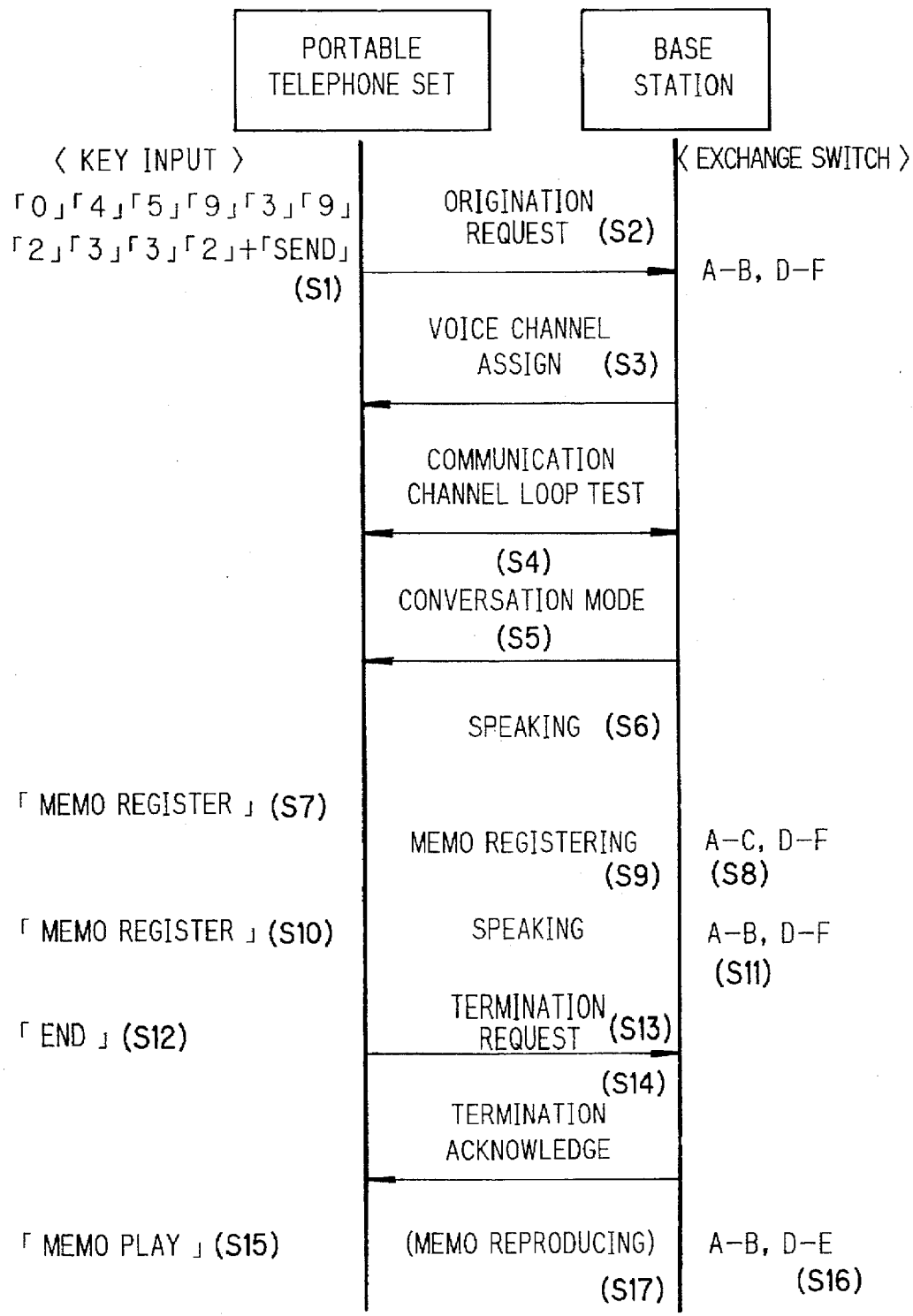

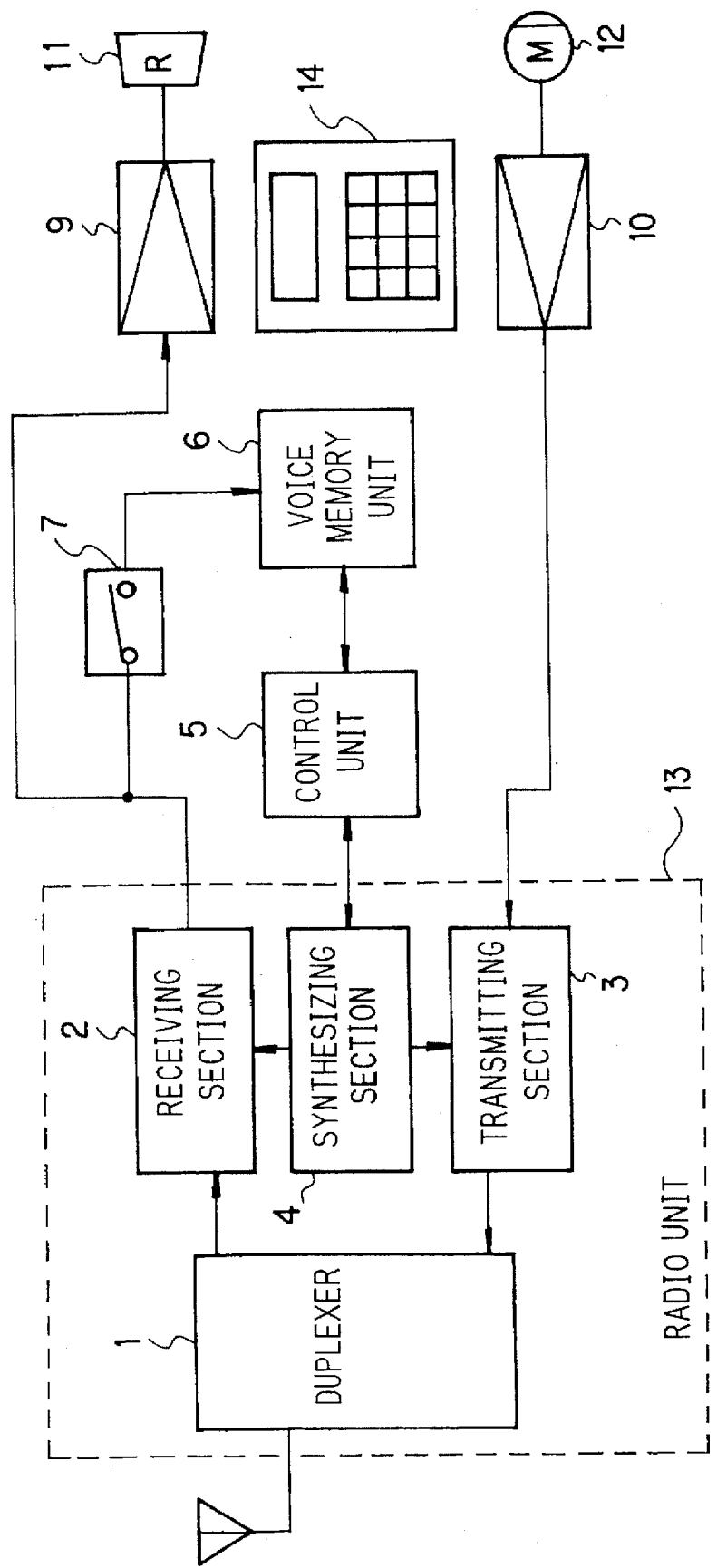

PORTABLE TELEPHONE SET INCORPORATING A MESSAGE RECORDING FEATURE

This is a Continuation of application Ser. No. 08/436,493 filed May 8, 1995 now abandoned.

BACKGROUND OF THE INVENTION

The present invention relates to a portable telephone set usable for mobile communication and capable of temporarily storing memo information by user's voice (speech) signals during communication without being heard by the other person in the communication.

There have been widely employed portable telephone sets usable in any place within their telephone service areas. The portable telephone set carrier i.e., the user, may frequently call or be called while walking or commuting in a train or a car. Often, situations occur where the user has to communicate while the user cannot write by hand some necessary information or contents of communication to be recalled later.

To cope with such situations, portable telephone sets which have a function of directly recording the communication contents have been proposed. A prior art example of one such portable telephone set will now be described with reference to FIG. 4. FIG. 4 is a block diagram showing the prior art example. When it is desired to directly record the audio signals received from another person during the communication, the voice signal of the other person can be stored in a voice memory unit 6 by operating by operating a switch 7.

Further, Japanese Patent Laid-open Publication No. Heisei 4-29447 discloses a portable telephone set with a voice recording function which may record either communication contents of the other person in the conversation or the user's own communication. Japanese Patent Laid-open Publication No. Heisei 4-296149 discloses another portable telephone set with a voice recording function. This telephone set normally serves as a tape recorder, but may be used as a portable telephone set. During its use as the portable telephone set, it permits recording of the communication contents.

The above prior art telephone sets have a purpose of directly recording communication contents. This means that the longer the communication time, the greater memory capacity is required. For example, in case of an ADPCM (Adaptive Differential Pulse Code Modulation) system with a sampling frequency of 4 Khz and a bit length of 4 bits, 512 Kbits RAM provides only about 32.7 sec for recording. Assuming the average communication time to be about 3 min, direct recording of the whole communication contents requires about 3 Mbits RAM.

However, the information actually required to be recorded is mostly very limited, such as telephone number, address, name of a responsible person. Japanese Patent Laid-open Publication No. Heisei 4-29447 shows a system capable of recording in response to the operation of a recording execution key. Japanese Patent Laid-open Publication No. Heisei 4-296149 also shows a system capable of recording the information for a desired period of time. In either case, however, it is impossible to allow only recording of the user's voice without transmitting the user's voice to the other end of the transmission during the communication. Therefore, the communication contents themselves must be recorded. In addition, it is difficult to avoid recording of unnecessary information during recording of the conversation.

SUMMARY OF THE INVENTION

The present invention has been intended in light of the above background, and its object is to provide a portable telephone set capable of recording minimum necessary information alone, without transmission of the unnecessary voice information to the other communication party.

According to an aspect of the present invention, a portable telephone set comprises a receiving section for receiving a radio signal and sending out a demodulation output thereof to a receiver, a transmitting unit for modulating a voice signal input from a transmitter and transmitting the voice signal as a radio signal, a voice memory unit for recording the voice signal, and a switch for temporarily inhibiting coupling of the output voice signal of the transmitter to the transmitting section, while allowing a coupling of the output voice signal to the voice memory unit for storing thereof. The switch may be a first push button switch operable by the user of the portable telephone set. The portable telephone set further comprises a second push button switch operable by the user of the portable telephone set for switching the input to the receiver between a demodulation output of the receiving section and a read output of the voice memory unit.

According to the present invention, a portable telephone communication recording method comprises the steps of sending out an origination request signal from a portable telephone set to a base station in response to an operation of a send key after a dial input through an operation unit, sending out a voice channel assign signal from the base station for assignment of a voice channel to the portable telephone set in response to the origination request signal, executing a loop test with the base station in response to receipt of the voice channel assign signal to check whether the assigned voice channel is capable of use by the portable telephone set sending out a conversation mode signal from the base station if the assigned voice channel is available for use, storing voice data in a voice memory in the portable telephone set in response to receipt of the conversation mode signal and an operation of a memo register key, making the portable telephone set ready for communication with the opposite party in response to an operation of the memo register key again after necessary information has been stored in the voice memory, sending out a termination request signal from the portable telephone set, executing an ending operation of the communication in response to subsequent operation of an end key, placing the portable telephone set into a waiting state in response to receiving a termination acknowledge signal from the base station, and reproducing the recorded information in response to an operation of a memo play key in the waiting state.

Other objects and features will be clarified from the following description with reference to attached drawings.

BRIEF DESCRIPTION OF THE DRAWINGS

FIG. 2 is a view of a key arrangement in an operating unit 14 of FIG. 1;

FIG. 3 is a flow chart illustrating a control of operation between a portable telephone set and a base station; and FIG. 4 is a block diagram showing the prior art example.

DETAILED DESCRIPTION OF THE EMBODIMENTS

Figure 1:
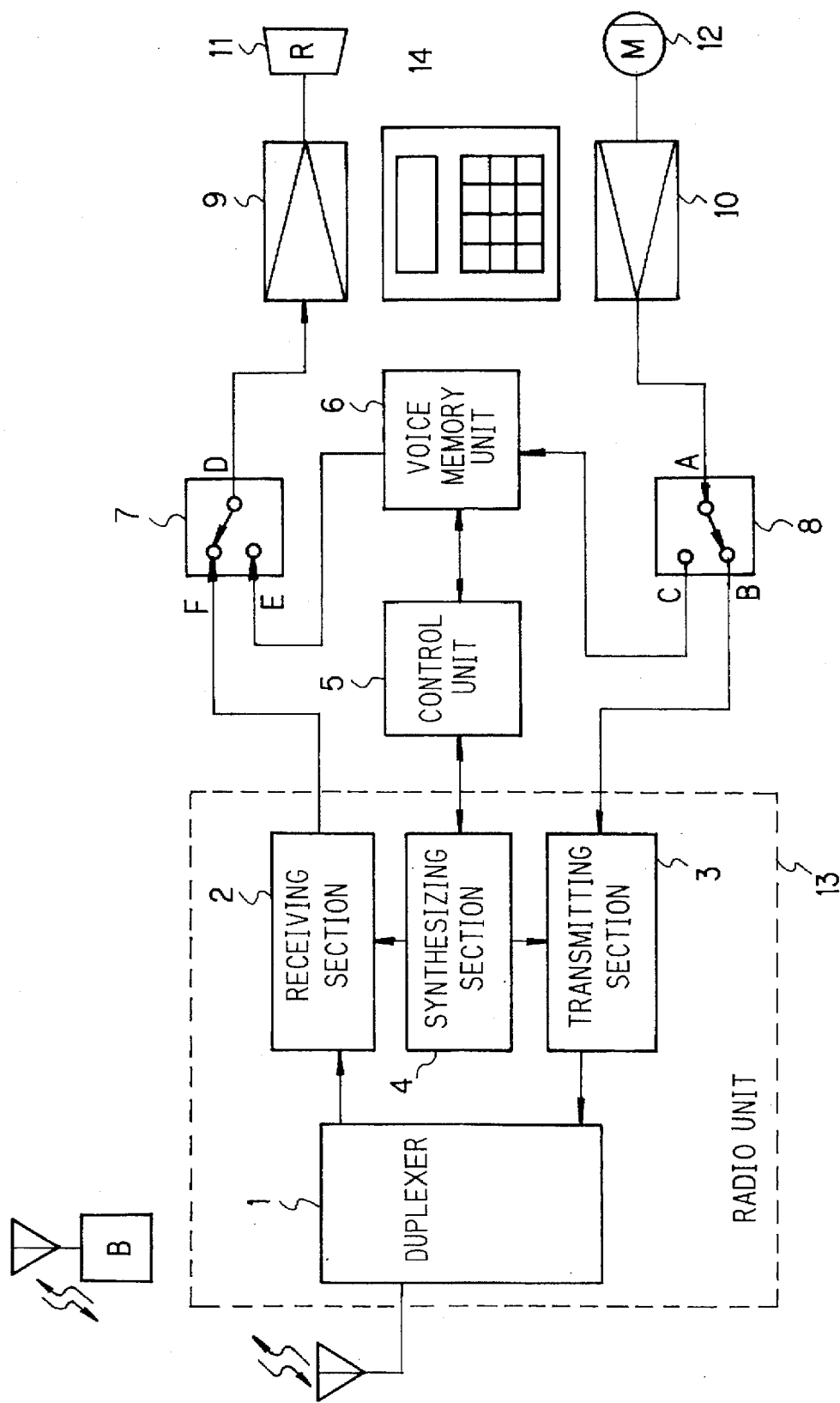
FIG. 1 is a block diagram showing an embodiment of the present invention.

In an embodiment of the present invention, a voice signal from the transmitter is supplied to and sent out from the transmitting section. If there is information which is desired to be recorded without transmission to the opposite party, the transmitter connected to the transmitting section is switched by operation to a voice memory unit. As a result, an output voice signal of the transmitter is not coupled as a modulation input to the transmitting section but instead is coupled as a write input to the voice memory unit. With this arrangement, information which is desired to be recorded as the user's record can be recorded without being heard by the opposite party. Thus, minimum necessary information such as telephone number, address, name of a responsible person, can be recorded in a small capacity memory without being heard by the other party to the communication. In real operation, while the other communication party is reciting the same information during the communication or when the speaking content is not important, the transmitter may be switched to be connected to the voice memory unit, and a content which is desired to be recorded may be spoken by the user to the transmitter in a very short period of time, and then the transmitter may be switched again to be connected to the transmitting section. During this time, the user's voice is not transmitted to the other party, and thus, there is no possibility of being rude to or giving an undesired impression to the other party.

An embodiment of the invention will be described with reference to FIGS. 1 and 2. FIG. 1 is a block diagram showing the embodiment of the present invention. FIG. 2 is a view of a key arrangement in an operating unit 14.

A portable telephone set according to an embodiment of the present invention comprises a receiving section 2 for receiving a radio signal and sending out a demodulation output thereof to a receiver 11, a transmitting section 3 for modulating a voice signal input from a transmitter 12 and sending out the modulated signal as the radio signal to the transmitting section 3, and a voice memory unit 6 for recording the voice signal. One of the important features of the present invention resides in a switch 8, which can temporarily inhibit coupling of the output voice signal of the transmitter 12 as the modulation input to the transmitting section 3, while coupling the output voice signal as the write input to the voice memory unit 6.

As shown in FIG. 2, a "MEMO REGISTER" key operates the switch 8 as a first push button switch operable by the user of the portable telephone set. A "MEMO PLAY" key is also provided which serves as a second push button switch operable by the portable telephone set user to connect the input of the receiver 11 either to the demodulation output of the receiving section 2 or to the read output of the voice memory unit 6.

This embodiment of the portable telephone set further comprises a radio unit 13 which includes a duplexer section 1, the receiving section 2, the transmitting section 3 and a synthesizing section 4; a control unit 5 for controlling the radio unit 13; an operating unit 14 having key input and display functions; the voice memory unit 6; the receiver 11; the transmitter 12; the switch 8 for exchangeably connecting a voice signal line to the transmitting section 3 of the radio unit 13 or the voice memory unit 6; and another switch 7 for exchangeably connecting the receiver 11 to the receiving section 2 or the voice memory unit 6 through input terminal E, F and an output terminal D.

Now, the operation of this embodiment will be described with reference to FIG. 3. FIG. 3 is a flow chart illustrating the control of operation between the portable telephone set and a base station B. The switch 8 includes input terminals B and C and an output terminal A, and in a normal state the terminals A and B are connected to each other. In response to a key input in a predetermined operation sequence from the operating unit 14, the portable telephone set is placed into a communication state. In the communication state, if the switch 8 is operated such that its terminals A and C are connected to each other, the voice data input to the transmitter 12 is sent to be stored in the voice memory unit 6. By operating the switch 7, the stored voice data can be reproduced in the receiver 11.

In FIG. 2, a "SEND" key is for off-hook operation, an "END" key is for on-hook operation, and a "MEMO REGISTER" key is for the operation of switching the switch 8 as described above. A "MEMO PLAY" key is for the operation of the switch 7 as described above.

FIG. 3 shows an operation sequence in this embodiment and a corresponding control of operation between the portable telephone set and base station B. In response to the operation of the "SEND" key after a dial input (for instance of "0", "4", "5", "9", "3", "9", "2", "3", "3", and "2") through the operating unit 14 (step S1), the portable telephone set sends out an "origination request" signal to the base station B (step S2). In response to this signal, the base station B sends out a "voice channel assign" signal to the portable telephone set (step S3). When the portable telephone set receives this signal, a loop test with the base station B is executed to check whether the assigned voice channel is usable (step S4). If the test is successful, the base station B sends out a "conversation mode" signal (step S5). In response to receipt of this signal, the portable telephone set is now ready for communication with the opposite party (step S6). When the "MEMO REGISTER" key is operated in this communication state (step S7), the switch 8 is switched from connection between its terminals A and B to connection between its terminals A and C (step S8), thus allowing voice data input to the receiver 12 to be stored in the voice memory unit 6 (step S9). By operating the "MEMO REGISTER" key again after necessary information has been stored in the voice memory unit 6 (step S10), the portable telephone set is now ready for communication with the opposite party (step S11). By subsequently operating the "END" key (step S12), a "termination acknowledge" signal is sent out from the portable telephone set (step S13). In response to receiving a "termination acknowledge" signal from the base station B by the portable telephone set (step S14), an ending operation of the communication is completed, and a waiting state sets in. When the "MEMO PLAY" key is operated in the waiting state (step S15), the switch 7 is switched from its state of connection between its terminals D and F to its state of connection between its terminals D and E (step S16) for reproducing the recorded information (step S17).

As has been described in the foregoing, according to the present invention it is possible to realize a portable telephone set capable of recording the minimum necessary information only without sending out unnecessary voice signal to the opposite side of communication transmission.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A portable telephone set comprising:
   a receiving section for receiving a radio signal and sending out a demodulation output thereof to a receiver;

a transmitting unit for modulating a voice signal input from a transmitter and transmitting the voice signal as a radio signal;

a voice memory unit for recording the voice signal; and a switch for temporarily inhibiting coupling of the output voice signal of the transmitter to the transmitting section while conversation is in progress and allowing coupling of the output voice signal to the voice memory unit for storing thereof.

2. The portable telephone set according to claim 1, wherein the switch is a first push button switch operable by the user of the portable telephone set.

3. The portable telephone set according to claim 2, further comprising a second push button switch operable by the user of the portable telephone set for switching an input of the receiver between a demodulation output of the receiving section and a read output of the voice memory unit.

4. A portable telephone communication recording method comprising the steps of:

sending out an origination request signal from a portable telephone set to a base station in response to an operation of a send key after a dial input through an operation unit;

sending out a voice channel assign signal from the base station for assignment of a voice channel to the portable telephone set, in response to the origination request signal;

executing a loop test with the base station in response to receipt of the voice channel assign signal to check whether the assigned voice channel is usable by the portable telephone set;

sending out a conversation mode signal from the base station if the assigned voice channel is available for use;

storing voice data in a voice memory in the portable telephone set in response to receipt of the conversation mode signal and an operation of a memo register key;

preparing the portable telephone set for communication with another party in response to a second operation of the memo register key after necessary information has been stored in the voice memory;

sending out a termination acknowledge signal from the portable telephone set in response to subsequent operation of an end key;

executing an ending operation of the communication and placing the portable telephone set in a waiting state in response to receiving a termination acknowledge signal from the base station; and reproducing the recorded information in response to an operation of a memo play key in the waiting state.

\* \* \* \* \*